Oct. 30, 1962   R. W. HENNING ETAL   3,060,855
CARTRIDGES AND CARTRIDGE FIRING APPARATUS
Original Filed Aug. 29, 1955   4 Sheets—Sheet 1
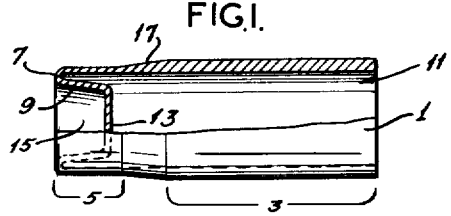
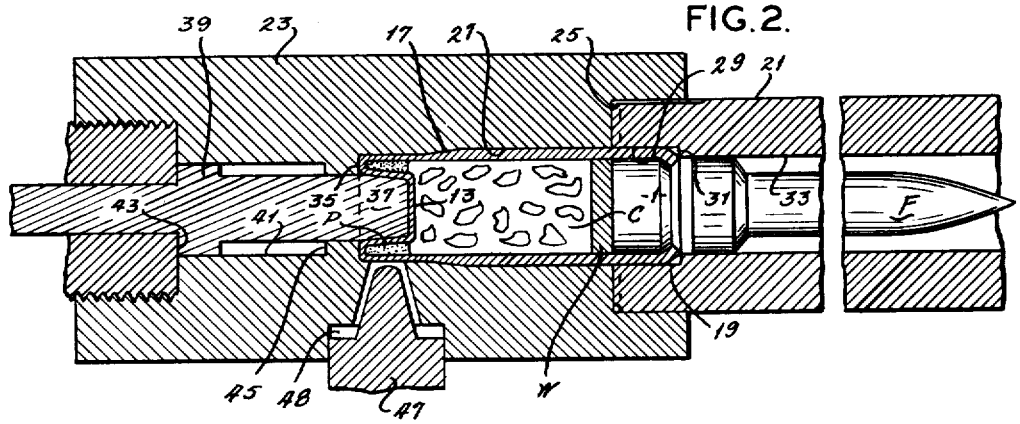
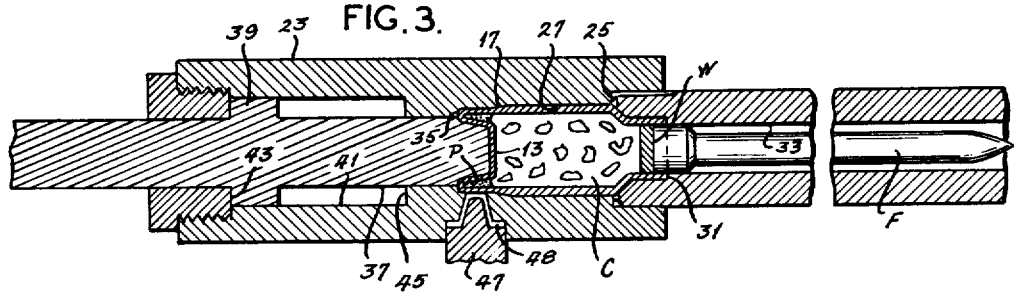
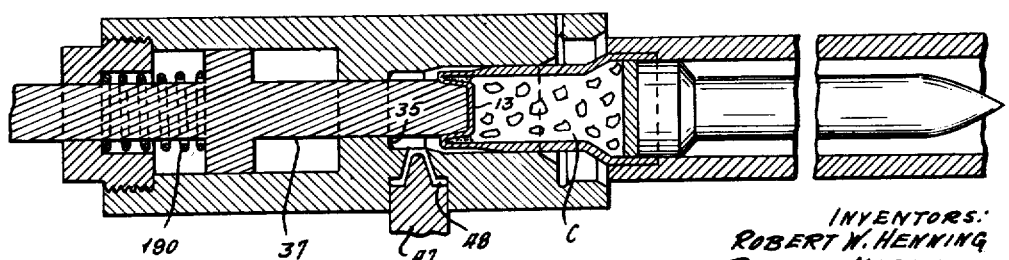
INVENTORS:
ROBERT W. HENNING
ROGER MARSH
By John D. Williams & Leonard S. Hoff
ATTORNEYS.

Oct. 30, 1962   R. W. HENNING ETAL   3,060,855
CARTRIDGES AND CARTRIDGE FIRING APPARATUS
Original Filed Aug. 29, 1955   4 Sheets-Sheet 2
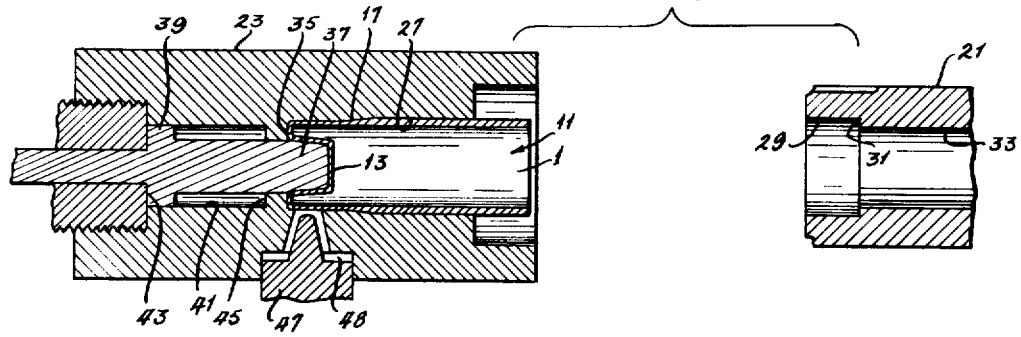
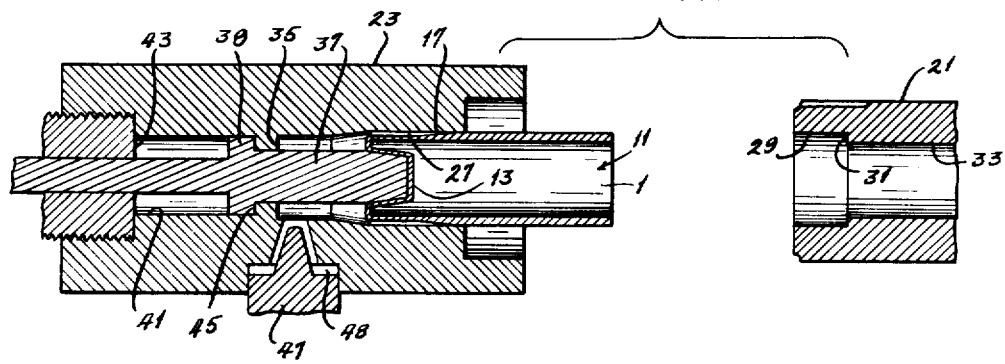
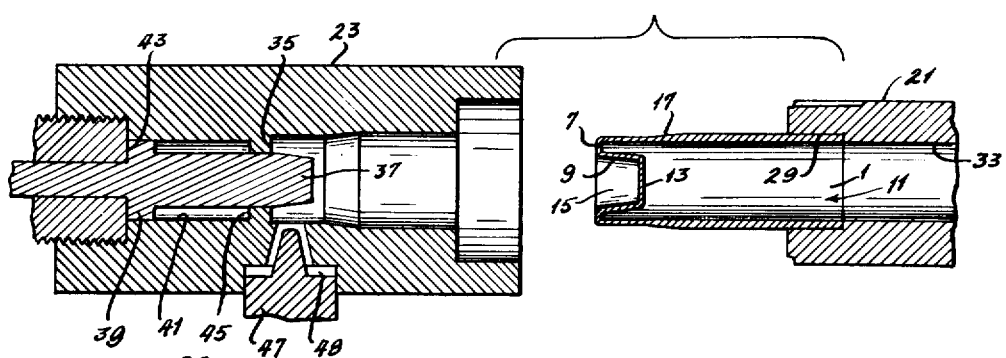
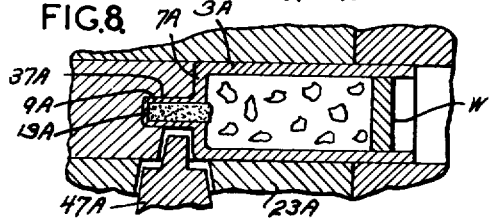
INVENTORS:
ROBERT W. HENNING
ROGER MARSH

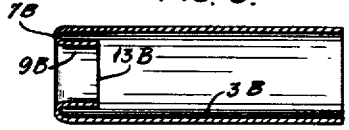
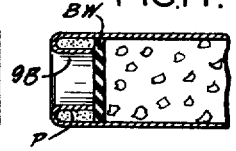
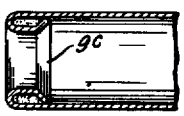
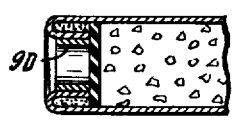
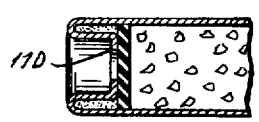
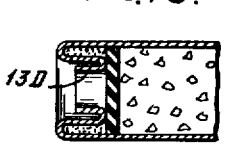
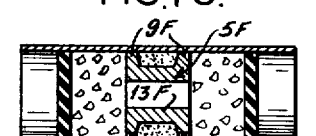
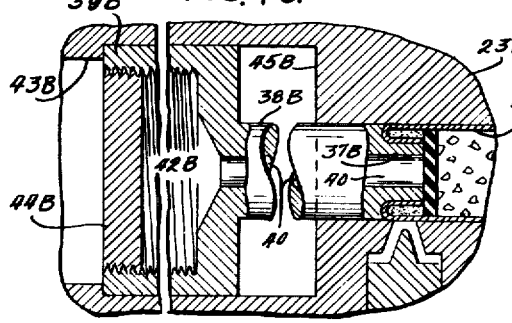
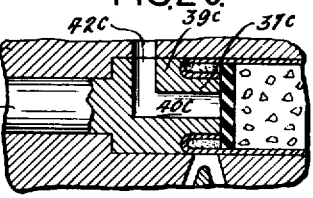
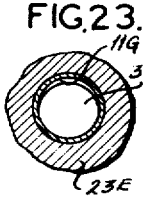
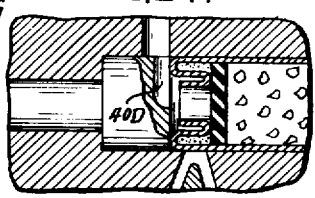
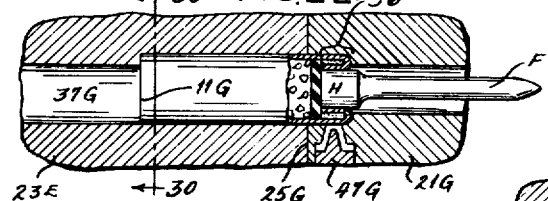
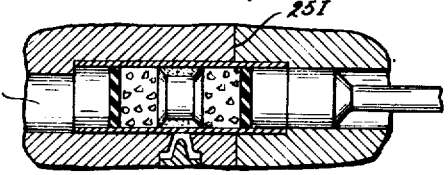
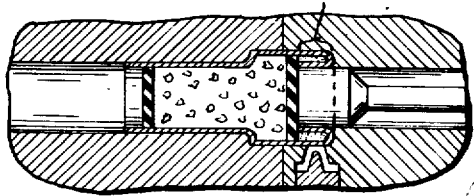

Oct. 30, 1962  R. W. HENNING ETAL  3,060,855
CARTRIDGES AND CARTRIDGE FIRING APPARATUS
Original Filed Aug. 29, 1955  4 Sheets-Sheet 4

INVENTORS:
ROBERT W. HENNING
ROGER MARSH
By John D. Wilkins & Leonard Goff
ATTORNEYS.

United States Patent Office 3,060,855
Patented Oct. 30, 1962

3,060,855
CARTRIDGES AND CARTRIDGE FIRING APPARATUS
Robert W. Henning, Rock River, and Roger Marsh, Hudson, Ohio, assignors, by mesne assignments, to Olin Mathieson Chemical Corporation, a corporation of Virginia
Original application Aug. 29, 1955, Ser. No. 531,113, now Patent No. 2,931,039, dated Apr. 5, 1960. Divided and this application Jan. 26, 1959, Ser. No. 792,939
16 Claims. (Cl. 102—38)

This invention relates broadly to cartridges and has particular utility in powder-actuated tools, although the invention is also applicable to firing arms. This application is a division of co-pending application Serial No. 531,113, filed August 29, 1955, now Patent No. 2,931,039.

It will be understood that powder-actuated tools utilize a charge of explosive to drive a penetrating fastener, the propellant usually being contained in a conventional rim-fire or center-fire cartridge case. The chamber is formed in the barrel of the device; and in breech loading devices, the cartridge case has the important function of obturating the chamber. That is, the case expands for an instant into sealing engagement with the bore of the chamber, thereby preventing rearward escape of gas through the gap between bolt and barrel.

Rim-fire cases are preferred because of their low cost, but they can be used only for small-bore low-power loadings. The rim must be readily deformable under the blow of the firing pin, and the rim is necessarily located at the face where the bolt head engages the barrel, which is the weakest part of the chamber. Accordingly, excessive loads are likely to result in rupture of the case at the relatively weak, poorly supported head. The weakness is in part overcome by the solid-head center-fire case, the head of which is thicker and stronger (only the primer cup being formed of soft metal), but this type of case is substantially more expensive to manufacture.

One of the objects of the invention, therefore, is to provide a cartridge possessing the low-cost attributes of a rim-fire case and the strength of a center-fire case. In particular, the invention is directed to the provision of a case having a body section containing the propellant and an integrally-joined head section containing the primer. The head section has a circumferential wall that is deformable by a radially-acting firing pin, and the posterior portion of the case with respect to the axial direction of ejection of the propellant and projectile fastener (including a substantial length of the body section) is of an outer dimension at any point therealong no larger than at any point anteriorly thereof in the posterior portion of the case. This posterior portion of the case is adapted to seat in and seal with a front loaded part of the chamber in the firing apparatus, the anterior portion being adapted to enter and seal with the barrel. Numerous embodiments are disclosed. The wall of the body section may be thicker than the circumferential outer wall of the head section; the head section may be disposed at either end or intermediate the ends of the case; the posterior end may be open or closed; the primer may be annular; the head section may include an inner circumferential wall integrally-joined to the outer wall to support the annular primer; and this inner circumferential wall may have a reinforcing wall integrally joined thereto.

The invention contemplates that this cartridge will be used with breech-loading apparatus wherein the chamber extends deeply into the bolt or block, the face of the bolt being bored to a depth sufficient to accommodate a substantial length of the body section. Preferably, the relation is one such that a major part of the case telescopes within the bolt, that portion of the body projecting into the barrel being sufficient, however, to obturate the chamber at the instant of firing and prevent escape of high-pressure gas at the breech face. A relatively thick-walled body section will better withstand rupture at this parting line; and since only a small part of the case extends into the barrel, seizure within the barrel is less likely to occur upon opening of the breech. Firing is accomplished by inwardly deforming the outer circumferential wall of the head section.

In conventional cartridge firing apparatus, the firing pin operates in an axial direction, consequently, the blow of the firing pin tends to drive the cartridge forwardly within the chamber, the head of the case perhaps being moved forwardly from the supporting portions of the bolt. This condition wherein the head of the case is unsupported at the instant of firing is especially like to occur when using rimless cases, but is avoided herein by providing a radially-acting firing pin, which may cooperate with an anvil underlying an annular primer. This anvil may be a discrete member within the case, a reinforced inner circumferential wall, a part of the ejector, or it may be the item to be propelled by the cartridge.

While it is an object of the invention to provide an inexpensive cartridge case that will withstand pressures higher than those permitted by rim-fire cases, the invention also contemplates provision of a cartridge especially suited for an improved extraction system for high-pressure applications. For example, powder-actuated tools are frequently operated at pressures substantially higher than those encountered in fire arms, and such high pressures lead to extraction difficulties. Indeed, a conventional spring-biased bolt-mounted claw extractor is not especially satisfactory in a powder-actuated tool, and the ramrod method of extraction is necessarily inconvenient.

In accordance with the present invention, the chamber especially suited for this type of cartridge extends deeply into the bolt of the firing apparatus, the relation being one such that only a small portion of the cartridge case projects beyond the bolt into the barrel. With this arrangement, a part of the case is uncovered when the breech is opened, the case usually remaining in the bolt. An ejector is then mounted in the bolt for axial movement, the ejector normally being retracted to form a part of the rear wall of the chamber but being advanced to eject a spent cartridge when desired. In the event that the cartridge sticks within the barrel upon opening of the breech, a substantial portion of the case is uncovered as the bolt is drawn back, and cartridge is then readily removed, as by a blow against the side of the case where it projects from the barrel.

The invention further contemplates an improved system of controlling the force with which a fastener is driven by a powder-actuated tool, such control being desirable because of differences in fasteners and the work materials encountered. An obvious expedient is that of supplying cartridges of different loadings, but this practice lacks convenience. When the loading is fixed, some control over the propelling force may be achieved by varying the "initial free air space" between propellant and projectile. For example, some operators initially place the fastener at a greater distance ahead of the propellant when a reduction in the propelling force is desired, but uniform results are difficult to achieve with this approach. Another technique involves use of venting ports near the muzzle of the barrel to bleed off a portion of the propellant gases at relatively low pressures, but diversion of gases by tapping the barrel is not entirely satisfactory.

Other features of the invention will be in part apparent from and in part pointed out in the following detail description taken in connection with the accompanying drawings, in which:

FIG. 1 is a longitudinal section of a cartridge case embodying features of this invention;

FIG. 2 is a longitudinal section of a cartridge and certain cartridge firing apparatus embodying features of the invention;

FIG. 3 is similar to that of FIG. 2 but illustrating an alternative embodiment wherein the mouth of the cartridge is of bottle-neck shape;

FIG. 4 is a view similar to that of FIG. 2 but showing a third embodiment wherein the mouth of the case is flared;

FIG. 5 is a view similar to that of FIG. 2, but with the breech open;

FIG. 6 is a view similar to that of FIG. 5 illustrating the manner in which the cartridge is normally ejected;

FIG. 7 is a view similar to that of FIG. 6 but showing an alternative manner of ejection;

FIG. 8 is a view similar to that of FIG. 1, but showing a different type of cartridge;

FIG. 9 is a view similar to that of FIG. 1 but illustrating an alternative embodiment of the invention, wherein the back of the cartridge is apertured;

FIG. 10 is a similar view showing a preliminary step in manufacturing the cartridge of FIG. 9;

FIG. 11 is a similar view illustrating a second step in the manufacture of the FIG. 9 cartridge;

FIG. 12 is a similar view, but discloses an alternative embodiment wherein the primer is held by a crimp;

FIG. 13 is a view similar to that of FIG. 9 but shows an alternative embodiment wherein the primer is supported on a reinforced part of the cartridge case;

FIG. 14 is a similar view showing an alternative method of reinforcement;

FIG. 15 is a similar view of another means of reinforcing the primer;

FIG. 16 is a similar view of a simplified version of the FIG. 9 cartridge;

FIG. 17 is similar to FIG. 16 but shows a further simplification;

FIG. 18 illustrates a double ended cartridge with a discrete primer-supporting element;

FIG. 19 is a view similar to FIG. 2 but shows an alternative embodiment of the gas bleed off and the cartridge of FIG. 9;

FIG. 20 is a similar view but illustrates another method of diverting the propellent gases;

FIG. 21 is a similar view disclosing another method of gas bleed off;

FIG. 22 is a view similar to that of FIG. 2 but showing cartridge firing apparatus wherein the primer is disposed at the anterior end of the cartridge supported upon the projectile;

FIG. 23 is a section taken on line 30—30 of FIG. 22;

FIG. 24 is a view similar to that of FIG. 22 but showing another type of cartridge;

FIG. 25 is a similar view showing firing apparatus for the cartridge of FIG. 18.

Figure 26:
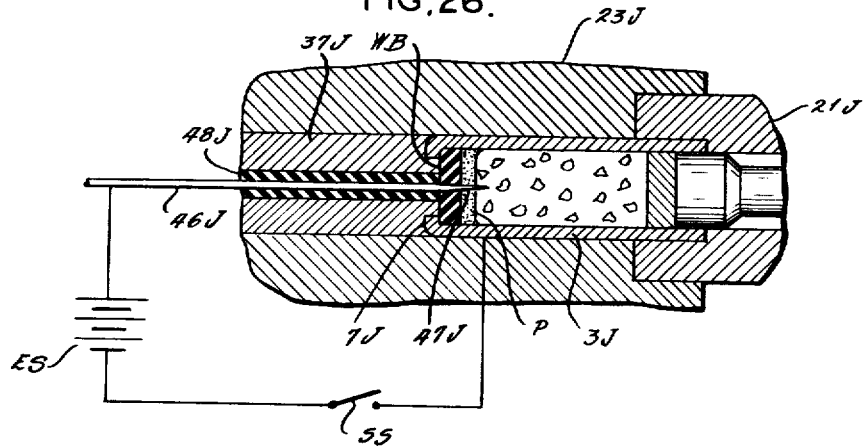
FIG. 26 is a view similar to that of FIG. 2 but of an electrically fired cartridge embodying the invention.

When a cartridge is fired, extremely high pressures are developed, these pressures being sufficient to expand the body of the case into sealing engagement with the wall of the firing chamber in the barrel. For an instant, the case is frozen to the barrel, but the case normally contracts sufficiently to permit easy extraction as the breech pressure drops upon movement of the projectile along and from the barrel. If the cartridge case is too weak for the pressures developed, however, the body does not contract properly and extraction becomes difficult. Rim-fire cartridges formed of soft copper may tear, and automatic operation is hindered because of the relatively large area of contact between barrel and case.

Moreover, those portions of the case that are weakly supported, especially in the region of the parting line between bolt and barrel, are susceptible to rupture under excessive breech pressures. For example, the head of a rimmed case cannot be fully supported because it lies at this parting line, and the head of a rim-fire case must be soft in order to permit deformation by a firing pin. Although the solid-head center-fire case is much stronger, blown primers and extraction difficulties are encountered when the breech pressures are high. Also, the center-fire case is more expensive to manufacture. For these reasons, the cartridge case has been a limiting factor in the design of high-powered apparatus, especially powder-actuated tools.

Referring now to FIGS. 1 and 2 of the drawings, there is shown an improved cartridge 1, which is suitable for high-power loadings yet which can be manufactured at a cost comparable to that of a rim-fire cartridge. The case is formed, as by a series of drawing operations, with an elongate cylindric body section 3 and a head section 5 integrally joined at the posterior end of the body section. The outer circumferential wall of this head 5 may be thinner than that of the body and is an outer dimension no greater than that of the body. Preferably, the inner wall diameters of parts 3 and 5 are the same. This head section 5, in turn, is integral about an open fold 7 with an annular reentrant shoulder or inner circumferential wall 9 of diameter somewhat less than that of the outer wall. The head 5, fold 7 and shoulder 9 thus define an annular channel, which opens forwardly to the body section 3. The primer mixture P is contained within this channel and a charge C of propellant is contained forwardly of the primer in the body, the charge being confined behind a wad W, preferably of plastic combustible material. The mouth 11 of the case at the anterior end is open, but the posterior end is closed by a web 13 extending integrally from the inner end of the shoulder-forming wall 9, so as to form a rearwardly opening cavity 15.

For example, a cartridge suitable for fasteners of one-quarter inch diameter might be made with an inside diameter throughout the outer wall of body 3 and head 5 of .250 inch, the outer diameter of the body wall being .300 inch and the outer surface of the head wall 5 tapering at 17 to a diameter of .276 inch. The wall thickness of the head 5 accordingly would be .112 inch, whereas the wall of the body 3 would be .025 inch thick. The shoulder-forming wall 9 preferably tapers slightly in the forward direction and is spaced from the wall 5 a distance such that the channel width is .020 inch at its base. The depth of cavity 15 might be .125 inch where the length of the thin-walled head 5 is .187 inch, and the overall length of the case may be from thirteen-sixteenths to one inch. Walls 7, 9 and 13 would not normally be held to precise thickness, but should be at least as thick as the head-forming wall 5.

A case satisfactory for fasteners of larger diameter may be made by increasing the inner diameter of the body, head and shoulder. In additon, a bottleneck case with a reduced mouth may be made, as shown in FIG. 3; or the mouth of the case may be flared, as illustrated in FIG. 4. Although cartridge brass is preferred, the design is such that steel or other materials may be used. It will also be apparent that the drawing operations are not difficult. For example, a disc would be drawn using the same techniques as those employed in drawing conventional rim-fire cases. Instead of bumping on a rim, however, the cup is subjected to a drawing operation that thins the head 5 and deforms the base 13 inwardly to provide the reentrant shoulder 9. In order to facilitate insertion of the case within a barrel, the mouth might also be crimped, as shown at 19 in FIG. 2, the crimp being ironed out by the forces developed upon firing.

Referring now to FIG. 2 of the drawings, the firing apparatus for this cartridge is shown to comprise the usual barrel 21 and a bolt or breech block 23, which closes against the barrel at a breech face 25. The face of the bolt 23 is bored out at 27 to form a relatively deep chamber, but the depth of the bore is less than the length of the cartridge, although it is sufficient to accommodate all of the thin-walled head portion 5 of the cartridge. Preferably, the section 27 of the chamber is of a length such that the cartridge case is primarily contained by the bolt and only a relatively short mouth portion projects beyond the breech face 25 into the barrel. That portion of the cartridge case projecting into the barrel should be sufficient, however, to seal the barrel when the cartridge expands at the instant of firing. This forward barrel portion 29 of the chamber may be in the form of a counterbore having a shoulder 31, which normally engages with the mouth end 11 of the cartridge case. The main bore 33 of the barrel is then of a diameter corresponding approximately to the inside diameter of the cartridge case.

When a bottle-neck case is employed, as shown in FIG. 3, the parting line should occur at or rearwardly of the shoulder on the case; and in that event, there would be no necessity for a shoulder such as shown at 31 in FIG. 2. If the cartridge is of a flaring bell design, the parting line between bolt and barrel would be at or forwardly of the shoulder on the cartridge case (FIG. 4).

At its other end, the fold 7 of the case is supported upon a part 35 of the bolt, which defines the base of the bore 27. The reentrant shoulder 9 and the web 13 of the case, in turn, are supported upon a forwardly projecting anvil 37, which anvil may be mounted for axial movement to function as an ejector. For example, the anvil 37 might be the nose of a rod having a collar 39, which slides within a cylindric recess 41 formed at the rear of the bolt. When the post is fully retracted to accommodate the cartridge, the collar 39 abuts against a part 43 of the mechanism, forward movement of the post upon ejection being limited by a shoulder 45 formed within the bolt. The nose of the post, which is received within the cavity 15 of the cartridge case, also functions as an anvil for a radially-moving firing pin 47, which pin is mounted opposite the thin-walled head section 5 of the cartridge in a recess 48. The firing pin 47 is shown in its normally retracted position, but may be advanced to crush the thin-walled head and ignite the primer.

It will be understood that the breech may be unlocked or the bolt may be locked against the barrel, as by locking lugs, but in either event, the apparatus should provide for a limited amount of straight axial movement of the bolt relative to the barrel, when the breech is opened. In other words, the bolt should move rearwardly or the barrel should move forwardly an amount sufficient to clear the cartridge case from the barrel, before the bolt is swung laterally, as illustrated in FIG. 5. The amount of this axial movement should also be sufficient to clear the cartridge case in the event that it should stick within the barrel.

In loading, the cartridge 1 and fastener F may be separate, as in FIG. 2, or a unitized assembly where the base of the fastener is seated within the mouth of the cartridge case, as in FIG. 3. After opening the breech, a cartridge and fastener are inserted within the barrel. As the breech is closed, the head of the cartridge telescopes within the bolt, the mouth of the case engaging the shoulder 31 within the barrel, so that the case is properly seated in the chamber with the portions 7 and 13 thereof supported, respectively, against the parts 35 and 37 of the bolt. The firing pin is then driven inwardly to fire the cartridge.

As the cartridge expands under the internal gas pressures, the forward mouth portion is expanded within the forward portion 29 of the chamber to seal the barrel, so that gas cannot escape rearwardly through the breech face 25. The thick-walled body 3 of the cartridge case overlies the breech face or parting line 25 and resists failure at this point, whereas the relatively thin-walled head 5 is readily deformable by the firing pin. Gas escape holes may be drilled into the recesses 41 and 48 to exhaust gas escaping thereto in event of failure of the case at a point within the bolt.

In opening the breech, the bolt 23 is initially moved straight back from the barrel; and in normal operation, the cartridge case would remain within the bolt since the area of contact with the bolt is substantially greater than that with the barrel. As illustrated in FIG. 5, the cartridge is extracted from the barrel automatically upon opening of the bolt. The cartridge is then ejected by advancing the axially movable post 37, as illustrated in FIG. 6. Should the web 13 of the case be punched from the body, ejection can be conveniently had by gripping the forwardly projecting mouth of the cartridge case to pull it from the bolt. If desired, however, the post 37 might be of a larger diameter so as to support the fold 7 of the cartridge as well as the portions 9 and 13.

This arrangement is to be contrasted with conventional firing apparatus wherein the entire body of a cartridge is received within the barrel and only a nominal head portion is recessed within the bolt. One of the advantages to be noted with this arrangement is that the area of engagement with the barrel is substantially less than that with the bolt, thus minimizing difficulties that might otherwise be encountered in extracting the case from the barrel. Such extraction difficulties are encountered when the charge is unusually heavy or in automatic apparatus. In the case of conventional automatic weapons, the breech may attempt to open while the wall of the cartridge is still frozen against the barrel chamber. When using apparatus of the type described herein, seizure within the barrel is less likely to occur since only a small part of the cartridge extends within the barrel.

In the event that the cartridge herein should freeze within the barrel, as in FIG. 7, ejection is still possible, inasmuch as a substantial portion of the case will be uncovered by rearward movement of the bolt; and in the normal instance, the cartridge may be knocked loose by a blow delivered radially against this rearwardly projecting portion of the cartridge.

Although several embodiments have been disclosed in detail, it should be understood that the invention encompasses many variations and modifications. For example, FIG. 8 illustrates a rimless case formed with a thick body section 3A and a back web or fold 7A, which define a front chamber for the propellant. The primer is contained in an integral cup-like head section of smaller diameter, which is formed with relatively thin walls 9A and 13A projecting rearwardly from the fold 7A. The primer pocket should be centered with respect to the body, so as readily to enter recess 37A in the firing mechanism, and the principles of operation are the same as those previously described, there being a transversely movable firing pin 47A set back so that a substantial portion of the body section is received within the bolt 23A.

FIGS. 9–11 illustrate a cartridge somewhat like that shown in FIG. 1, but the back of the case is open. The case is formed with a cylindric body 3B, an annular rear fold 7B and an annular reentrant shoulder or inner wall 9B, but the back of the case is left open at the inner edge 13B. Such a cartridge case might be formed from cylindric tubing, such as illustrated in FIG. 10; and the first stage in the manufacturing process would be that of forming the fold 7B and shoulder 9B. The primer P is inserted, preferably as a previously molded ring or as a paste that dries in place (FIG. 11), and a base wad BW is pressed against the inner edge 13B. In such event, the base wad serves to hold the primer in position, but a portion of the shoulder might be crimped over as indicated at 9C in FIG. 12. The base wad of such cartridge should necessarily provide for passage of the ignition flame into the body section containing the primer, and in most instances, the base wad will be formed of a material which is entirely consumed in firing the cartridge.

In firing the cartridge of FIG. 9 with a transversely-movable firing pin, it will generally be necessary to support the inner wall 9B upon an avil, as shown in previous embodiments. On the other hand, the anvil support is not essential if the inner wall of the head section is strengthened against collapse. Such reinforcement may be in the form of a supplementary collar as shown at 9D in FIG. 13, or it may be the apertured radial flange 11D shown in FIG. 14, or a reverse annular fold 13D may be formed, as indicated in FIG. 15.

In most of the previous embodiments, the head section is formed by integrally-joined inner and outer walls, but the inner wall might be eliminated, as indicated at 13E in FIG. 16. Even the end fold could be dispensed with, as appears at 7E in FIG. 17. These modifications will require the use of a self-supporting or adhesively secured ring of primer composition, but such materials are known to those skilled in the art. Necessarily, an anvil is used in firing the cartridges of FIGS. 16 and 17.

FIG. 18 illustrates a variant wherein the primer is disposed midway intermediate the ends 11F of a cylindric tube-like body 3F and is supported by a discrete anvil 5F provided within the case. This anvil element is in the form of a spool, the center portion 13F of which may be open. The outer periphery of the spool is formed with an annular channel defined between flanges 9F, which are shown in part open at the sides through notches 7F. The spool should be of sufficient strength to permit crushing of the primer by indentation of the outer wall, that portion opposite the spool being the intermediate section corresponding to the head section of the other embodiments, which in this instance could be of reduced wall thickness relative to the other portions of the case. This gives the case the advantage of reversibilty so that no matter how the operator inserts it, it makes no difference in operation.

In each instance, the cartridge is adapted to obturate the parting line at the breech face of breech-loading apparatus. Any appropriate deformable material might be employed in making the above-described cartridge case and while cartridge brass is the most obvious material, other possibilities include other metals, cardboard, and synthetic plastic materials.

Whereas there are numerous disclosed variations of the cartridge case, the invention contemplates variations in the firing mechanism, and particularly in the manner of supporting the primer, the way in which propellent gases are bled through the breech block, and the method of ejecting a cartridge.

Referring now to FIG. 19, there is shown firing apparatus such as might be employed with the cartridge of FIG. 9. The apparatus, in general, is similar to that shown in FIG. 2, in that there is a barrel and a cooperating bolt or breech block 23B, which engage with one another at breech face. The bolt 23B is formed with an axial bore 27B extending rearwardly to accommodate a substantial portion of the cartridge, and the back of the cartridge is supported upon a telescoping ejector 38B. The forward portion 37B of element 38B is of reduced diameter so as to form an anvil 37B for the head section at 9B of the cartridge, whereas the opposite end 39B of the ejector is of substantially larger cross section and abuts against a rear stop 43B, when the cartridge is in firing position. The ejector may be moved forwardly against a stop 45B, however, to eject the cartridge.

It will also be noted that a passageway 40 extends axially through the ejector 38B from the anvil-forming portion 37B to an enlarged chamber 42B. This chamber may be threaded, and an adjustable plug 44B is provided to vary the volume of the chamber and thereby the power of the cartridge. Otherwise, the apparatus is similar to that described heretofore.

FIGS. 20 and 21 illustrate modifications wherein the propellent gases are bled off through the bolt or breech block 23C. In FIG. 20 the anvil 37C and part 39C of the ejector have a right angular passageway 40C, which communicates with a radial passage 42C in the bolt when the cartridge is in firing position. It will be understood that the ejector is axially movable but may be restrained against rotary movement, so that the passages 40C and 42C register when the anvil is retracted.

The apparatus shown in FIG. 21 is similar to that illustrated in FIG. 20, but in this instance, the anvil is eliminated and one or more radially-extending grooves 40D perform the function of the passageway 40C described above. In using this type of apparatus, it is preferable to employ a cartridge of the type illustrated in FIGS. 13–15, wherein the inner wall of the head section is reinforced. It will also be understood that the requirement for registry of the passages with the fixed passages may be overcome by providing an annular channel in the bolt or ejector.

In each of the above-described firing devices, the primer is rearwardly disposed and the propellant is located forwardly of the primer. This relationship may be reversed, however. Front ignition offers advantages in that there is less tendency for powder grains to be blown into the barrel when partially burned.

Referring to FIG. 22, the primer or head section 5G is shown to be disposed at the front of the cartridge and is supported against collapse by the head H of a fastener F. In this case, the firing pin 47G is mounted for transverse movement within the barrel 21G, and the parting line or breech face 25G of breech block 23G is disposed rearwardly of the firing pin. The back end 11G of the cartridge, which corresponds to the mouth of FIG. 1, may be closed or it may be open for cooperation with gas bleed off passages. Where the back end 11G is open, the forward portion 37G of the ejector should overlap with at least a portion of the case. In other words, the ejector nose 37G should be of an outside diameter greater than the inside diameter of the cartridge, or the ejector nose may be eccentrically disposed as illustrated in FIGS. 22 and 23. FIG. 24 illustrates a variant of FIG. 22 wherein the head section 5H and adjacent part of the body section of the cartridge are of a bottle neck design or relatively enlarged with respect to the remainder of the case.

FIG. 25 illustrates apparatus of a type suitable for the cartridge of FIG. 18, and is similar to that previously described. One of the advantages of this system is that the firing pin is spaced from both the breech face 25I and the ejector 38I. If both ends of the case are left open, the cartridge may be reversible; and while the anvil 5F is a separate element, the remainder of the case is extremely simple.

Referring now to FIG. 26, it may be desirable to eliminate the usual firing pin and substitute an electrical firing system. The space gained in removing a mechanical firing pin might be employed more usefully in the disposition of other parts of the tool, and a stronger breech construction is generally possible. In the FIG. 2 embodiment, for example, the interruption 48 in the breech block 23 is a weakness and gases might escape through the adjacent portion of the cartridge case, which is weakened and deformed by the firing pin 47.

In FIG. 26, the cartridge case is more firmly supported, the only interruptions occurring at points where the wall of the cartridge is relatively strong. The cartridge, itself, may be of the open back type so that an electrical connection may be made to the primer P. The cartridge case is formed with a cylindric body 3J and a rear flange 7J, which supports base wad BW. This wad may be a disc of insulating material, and the primer is a similar disc held against the inner face of the base wad. Although the primer is shown unsupported, suitable means may be provided for holding the primer in proper position. The breech block 23J and barrel portion 21J are as described heretofore, but the anvil or ejector 37J is somewhat different.

The base wad is adapted to be punctured by a needle 47J, which is a portion of an electric conductor 46J extending axially through the ejector and held in insulated relationship therewith by insulation 48J. The circuit is continued from the conductor 46J, as indicated diagrammatically, through an electric supply ES and switch SS to the wall of the cartridge case, so that a circuit is completed through the primer P. As the breech is closed, the needle is driven through the base wad BW into electrical contact with the primer. If corrosion difficulties are encountered, the needle may be eliminated by providing the cartridge with a contact button (not shown) extending from the primer through the base wad BW for electrical engagement with the conductor 46J. Other arrangements will also be apparent to those skilled in the art.

A number of embodiments have been discussed, hence it may be useful to review broadly some of the features of this invention. In all instances, the cartridge compares favorably in cost and simplicity with conventional rim-fire cartridges but offers advantages in strength and ease of extraction. The primer-containing portion of the case is not located at the breech face but is recessed within the bolt (in most instances) or within the barrel (when front ignition is desired). For this reason, the primer section of the case may be thin in order to facilitate crushing of the primer, whereas the integral body section may be thick in order to resist failure at the breech face and facilitate extraction. The method of extraction and ejection permits high-power loadings, and the transversely-movable firing pin does not displace the cartridge longitudinally within its firing chamber.

In certain embodiments, further advantages are derived in bleeding off propellent gases through the bolt and receiver, rather than through the barrel; and bleed-off may be facilitated by providing an opening in the back of the case. Although the invention contemplates that the primer may be centrally supported upon an anvil-forming portion of the ejector, the case may form its own anvil, or the item to be propelled may function as an anvil.

Other features of the invention will be apparent to those skilled in the art, and although more than several embodiments have been disclosed, the invention should not be considered so limited, as still other embodiments will readily occur to those skilled in the art, without departing from the spirit of the invention or the scope thereof, as set forth in the appended claims.

Having thus described the invention, what is claimed and desired to be secured by Letters Patent is:

1. Cartridge of small arms caliber adapted to be fired into an axially extending bore of a propellent powder actuated apparatus by transverse acting firing means for driving a projectable element in said bore wherein the apparatus is of the type having a barrel and a breech block in slide action relationship so as to form a two-part cartridge chamber the two portions of which are axially aligned and separable intermediate the ends of said chamber, said barrel having said bore of a given caliber and a rearwardly opening forward portion of said chamber in communication with said bore and larger than said caliber to form a front shoulder with said bore, said block having a forwardly opening rearward portion of said chamber forming a rear shoulder therein, said cartridge comprising a metal case formed with an elongated tubular section, a charge of said powder in said section, said section having an anterior portion formed of a chamber fitting and maximum transverse dimension at any point along its length not in excess of said dimension at any point rearwardly thereof in said portion for slidable entry forwardly into said forward portion of the chamber and with an open front end having a front periphery defining an opening for communication with said bore, said front end periphery being for mating abutment with said front shoulder, said section having a posterior portion extending axially over a substantial length of said tubular section and being of chamber fitting and maximum transverse dimension at any point along its length not in excess of said dimension at any point forwardly thereof in said posterior portion whereby said posterior portion may rearwardly enter said rearward portion of the chamber slidably in abutment with said rear shoulder, said tubular section having an integrally joined rimless firing head positioned at one end of said section, a primer in said head positioned in radially responsive operable proximity with said firing means uniformly around said head, and a front closure in said anterior portion of the case adjacent said open front end adapted to be opened with respect to the bore upon firing of said powder, said head and the adjacent part of the tubular section forming a concentric space for reception of concentric anvil means in at least one of said case and apparatus.

2. The cartridge of claim 1 wherein the primer is an uninterrupted annular charge and wherein the head and its concentric space and an included annular anvil member integral with the case are disposed together at one end of the said tubular section.

3. A cartridge as set forth in claim 2, wherein said head has an outer circumferential wall that is deformable by a firing pin, the wall of said tubular section being relatively thick in comparison with said outer circumferential wall of the head.

4. A cartridge as set forth in claim 2, wherein said head has an outer circumferential wall that is deformable by a firing pin, said primer being of annular shape and lying against the inner surface of the outer circumferential wall of said head.

5. A cartridge as set forth in claim 4, further including inwardly-disposed means supporting said primer along its inner circumferental surface.

6. A cartridge as set forth in claim 4, wherein said case is open at both ends, and further includes as the closure a sealing element disposed within the tubular section between the primer and propellant.

7. A cartridge as set forth in claim 4, wherein said head is at one end of the case, said case further including an integral fold extending radially inward at the outer end of said head.

8. A cartridge as set forth in claim 7, wherein the head further includes an inner annular wall disposed opposite said outer circumferential wall of the head and integrally-joined with said radial fold to define an annular channel containing the annular primer.

9. A cartrdige as set forth in claim 8, further including a reinforcing wall for said inner circumferential wall of the head, said inner circumferential wall of the head being integrally joined at one of its ends to said radial fold and at its other end to said reinforcing wall.

10. A cartridge as set forth in claim 9, wherein said reinforcing wall extends radially.

11. A cartridge as set forth in claim 10, wherein said radial reinforcing wall is imperforate to close the adjacent end of the case.

12. A cartridge as set forth in claim 1, further including reinforcing means supporting said inwardly-disposed primer-supporting means as an anvil for the primer.

13. A cartridge as set forth in claim 12, wherein said head is disposed at the anterior end of the case, said anvil-forming means being part of an element to be driven by the cartridge.

14. A cartridge as set forth in claim 12, wherein said head is disposed substantially midway intermediate the ends of the case.

15. The cartridge of claim 14 wherein the reinforcing means is substantially all grooved and primed.

16. The cartridge of claim 1 wherein the anterior and posterior portions are of different transverse size.

References Cited in the file of this patent

UNITED STATES PATENTS

| 44,660 | Root | Oct. 11, 1864 |
| 1,461,013 | Hodge | July 3, 1923 |
| 2,424,934 | Kasper | July 29, 1947 |
| 2,818,811 | Kempler | Jan. 7, 1958 |

FOREIGN PATENTS

| 2,623 | Great Britain | 1864 |